No. 832,374. PATENTED OCT. 2, 1906.
A. GILLIES.
MOUTHPIECE FOR PNEUMATIC TEAT CUPS.
APPLICATION FILED MAR. 22, 1906.
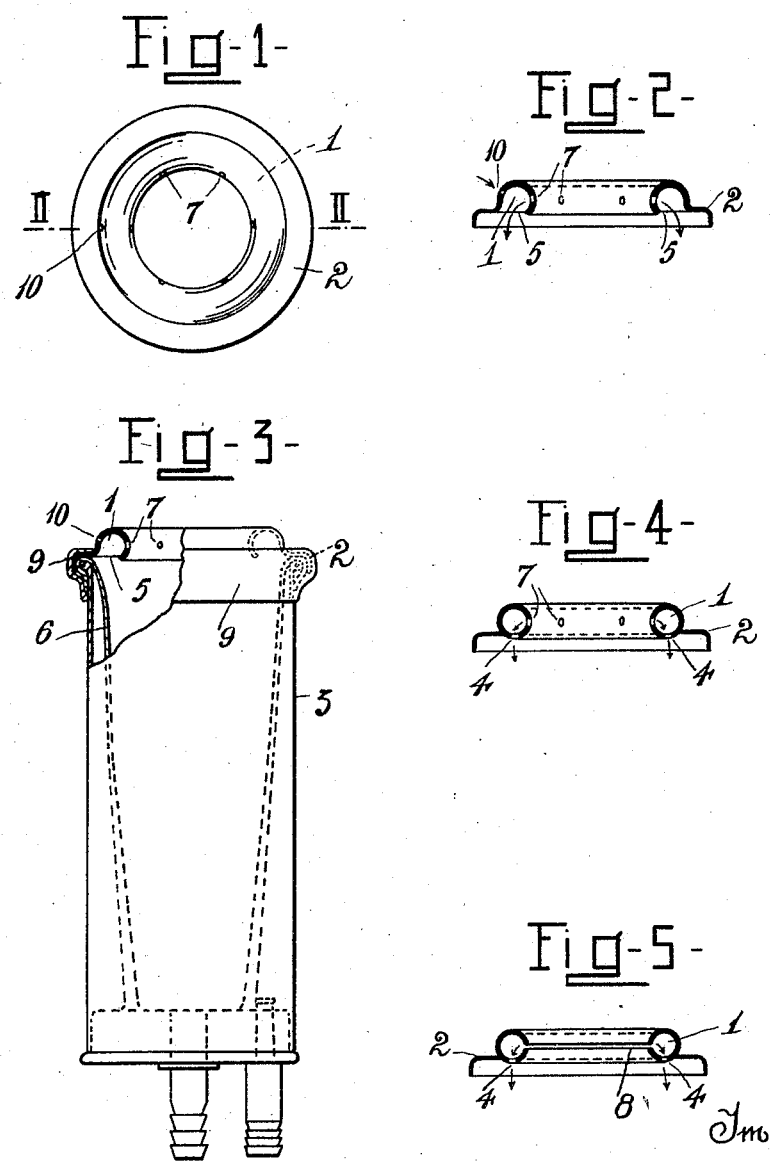
Inventor
Alexander Gillies

UNITED STATES PATENT OFFICE.

ALEXANDER GILLIES, OF GEELONG, VICTORIA, AUSTRALIA.

MOUTHPIECE FOR PNEUMATIC TEAT-CUPS

No. 832,374.  Specification of Letters Patent.  Patented Oct. 2, 1906.

Application filed March 22, 1906. Serial No. 307,454.

*To all whom it may concern:*

Be it known that I, ALEXANDER GILLIES, dairyman, a subject of the King of Great Britain, residing at 69 Myers street, Geelong, in the State of Victoria, Australia, have invented an Improved Mouthpiece for Pneumatic Teat-Cups, of which the following is a specification.

Hitherto in pneumatic milking-machines more or less flexible mouthpieces have been employed on the teat-cups for the purpose of enabling same to grip the teat, and it has been proved in practice that the pressure on the teat is inclined to close the milk-passage therein, and so decrease the efficiency of the machine.

The object of my invention is to overcome this defect and at the same time provide a more durable mouthpiece. Accordingly the mouthpiece is formed of substantially rigid substance, such as metal, having a hollow chamber with openings on the under side in communication with the suction in the cup and openings through its inner periphery. The mouthpiece is detachable and is secured to the cup by means of a rubber cap or band. With a mouthpiece so constructed there is a direct suction on the exterior of the teat which draws same outwardly against the inner periphery of the mouthpiece, thus securely holding the cup and preventing the contraction of the milk-passage in the teat.

The invention is clearly illustrated by the accompanying drawings, whereof—

Figure 1 is a plan of the mouthpiece; Fig. 2, a central transverse section on line 11 11, Fig. 1; Fig. 3, an elevation of a teat-cup, partly in section, with the mouthpiece attached thereto; Figs. 4 and 5 are similar views to Fig. 2, showing examples of the various shapes the hollow chamber may take.

Referring to the drawings, 1 represents the annular hollow or chambered portion of the metallic mouthpiece, which is raised above the flange 2 thereof and is in direct communication with the suction in the cup 3 either by means of the holes 4, as illustrated in Figs. 4 and 5, or by a continuous opening 5, as illustrated in Figs. 2 and 3. The object of said raised hollow or chambered portion 1 is to insure a free passage to the suction-pressure and also to enable the usual pulsating tongue, bag, gum, or inner flexible chamber 6 to operate as near the root of the teat as possible.

The inner periphery of the hollow chambered portion of the cup is formed with a number of holes 7, as illustrated in Figs. 1, 2, 3, and 4, or similarly, again, by a continuous slot 8, as illustrated in Fig. 5. The object of these openings is to place the teat in communication with the suction in the cup, and so draw the skin of said teat against the inner periphery of the mouthpiece, and thereby hold the teat-cup securely on the teat, and at the same time overcome the tendency of teat-cups to close the milk-passage of the teat, as is usual where a compression-mouthpiece is employed for gripping same.

The hollow or chambered portion of the mouthpiece may of course vary in shape or section so long as the object for which it is designed is achieved.

The flange 2 is preferably turned down on its outer periphery, as shown, and adapted to fit substantially around the teat-cup, and the mouthpiece is secured thereto by a rubber band 9, Fig. 3, engaging said flange.

In the drawings, 10 represents an air-inlet, as described in my previous patent, numbered 744,188, for the purpose of admitting atmospheric pressure behind the milk in order to assist the flow of same to the milk-receiver.

The mode of operation is as follows: The teat-cup is slipped over the teat and the suction applied, so that the air-pressure in the hollow chamber of the mouthpiece is reduced, which causes the teat to adhere thereto. The pulsations are then admitted to the cup, which cause the teat to be first squeezed and then released. During the former action the hollow chamber is temporarily almost cut off from direct communication with the suction in the cup, but it still retains sufficient suction power, together with the grip of the inner lining, to hold said cup on the teat, and when the flexible lining of the cup is exhausted or deflated the air admitted through the air-inlet rushes down and drives the milk from the cup toward the receiver, as previously mentioned.

Having now particularly described and ascertained the nature of my said invention and in what manner the same is to be performed, I declare that what I claim is—

1. An improved mouthpiece for pneumatic teat-cups made of a substantially rigid substance such as metal and having a hollow chamber the under side of which is in communication with the suction in the cup, and the inner periphery of which is formed with openings substantially as and for the purpose set forth.

2. An improved mouthpiece for pneumatic teat-cups made of a substantially rigid substance such as metal having a flange to fit substantially round the top of the teat-cup, and a raised hollow chamber which substantially encircles the root of the teat, said chamber having openings on its under side and internal periphery substantially as and for the purpose set forth.

3. An improved mouthpiece for pneumatic teat-cups made of a substantially rigid substance such as metal having a flange to fit substantially round the top of the teat-cup, and a raised hollow chamber which substantially encircles the root of the teat, said chamber having openings on its under side and internal periphery and an air-inlet in its external circumference substantially as and for the purpose set forth.

4. In a metallic mouthpiece for pneumatic teat-cups a raised annular hollow chambered portion with openings in the under side and around the internal periphery thereof substantially as and for the purpose set forth.

5. In a metallic mouthpiece for pneumatic teat-cups a raised annular hollow chambered portion completely open on its under side and having a series of holes on its internal periphery substantially as and for the purpose set forth.

In testimony whereof I have hereunto set my hand in presence of two subscribing witnesses.

ALEXANDER GILLIES.

Witnesses:
EDWARD N. WATERS,
WILLIAM H. WATERS.